United States Patent
Kato

(10) Patent No.: US 9,491,152 B2
(45) Date of Patent: Nov. 8, 2016

(54) DATA TRANSMISSION APPARATUS, DATA TRANSMISSION METHOD, AND NON-TRANSITORY COMPUTER READABLE MEDIUM

(71) Applicant: FUJI XEROX CO., LTD, Minato-ku, Tokyo (JP)

(72) Inventor: Nobutaka Kato, Kanagawa (JP)

(73) Assignee: FUJI XEROX CO., LTD, Tokyo (JP)

( * ) Notice: Subject to any disclaimer, the term of this patent is extended or adjusted under 35 U.S.C. 154(b) by 0 days.

(21) Appl. No.: 14/205,652

(22) Filed: Mar. 12, 2014

(65) Prior Publication Data

US 2015/0046975 A1 Feb. 12, 2015

(30) Foreign Application Priority Data

Aug. 9, 2013 (JP) ................................. 2013-166096

(51) Int. Cl.
G06F 21/00 (2013.01)
H04L 29/06 (2006.01)
(52) U.S. Cl.
CPC .................... H04L 63/08 (2013.01)
(58) Field of Classification Search
CPC ....... H04L 63/08; H04L 63/10; H04L 63/20; H04L 29/06; H04L 63/0428; H04M 1/72583
See application file for complete search history.

(56) References Cited

U.S. PATENT DOCUMENTS

| 2007/0150289 | A1* | 6/2007 | Sakuramoto et al. ........ 704/275 |
| 2011/0022723 | A1* | 1/2011 | Inoue ................. H04N 1/32411 709/238 |
| 2012/0299814 | A1* | 11/2012 | Kwon et al. .................. 345/156 |

FOREIGN PATENT DOCUMENTS

| JP | 2000-341465 A | 12/2000 |
| JP | 2009-171309 A | 7/2009 |
| JP | 2010-016657 A | 1/2010 |
| JP | 2011-139145 A | 7/2011 |
| JP | 2011-160463 A | 8/2011 |
| JP | 2012-195950 A | 10/2012 |

* cited by examiner

Primary Examiner — Chau Le
Assistant Examiner — Ghodrat Jamshidi
(74) Attorney, Agent, or Firm — Sughrue Mion, PLLC

(57) ABSTRACT

A data transmission apparatus having an authentication mode in which user authentication is required in order to transmit data and a non-authentication mode in which data may be transmitted without requiring user authentication includes an authenticating unit that authenticates a user, an address acquiring unit that acquires a destination that is a transmission destination of data and that is associated with the user who is authenticated, a history information acquiring unit that acquires history information that is a group of destinations that have been used previously, and a display that displays the destination, which is associated with the user who is authenticated, as a destination of data in the case where the authenticating unit performs user authentication successfully in the authentication mode and that displays a destination that is included in the history information as a candidate for a destination of data in the non-authentication mode.

8 Claims, 10 Drawing Sheets

DATA TRANSMISSION APPARATUS, DATA TRANSMISSION METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-166096 filed Aug. 9, 2013.

BACKGROUND

Technical Field

The present invention relates to a data transmission apparatus, a data transmission method, and a non-transitory computer readable medium.

SUMMARY

According to an aspect of the invention, there is provided a data transmission apparatus having an authentication mode in which user authentication is required in order to transmit data and a non-authentication mode in which data may be transmitted without requiring user authentication, the data transmission apparatus including an authenticating unit that authenticates a user, an address acquiring unit that acquires a destination that is a transmission destination of data and that is associated with the user who is authenticated, a history information acquiring unit that acquires history information that is a group of destinations that have been used previously, and a display that displays the destination, which is associated with the user who is authenticated, as a destination of data in the case where the authenticating unit performs user authentication successfully in the authentication mode and that displays a destination that is included in the history information as a candidate for a destination of data in the non-authentication mode.

BRIEF DESCRIPTION OF THE DRAWINGS

Exemplary embodiments of the present invention will be described in detail based on the following figures, wherein.

DETAILED DESCRIPTION

First Exemplary Embodiment

Data transmission apparatuses 10 according to exemplary embodiments of the invention will be described below. Note that the invention is not limited to the following exemplary embodiments.

Figure 1:
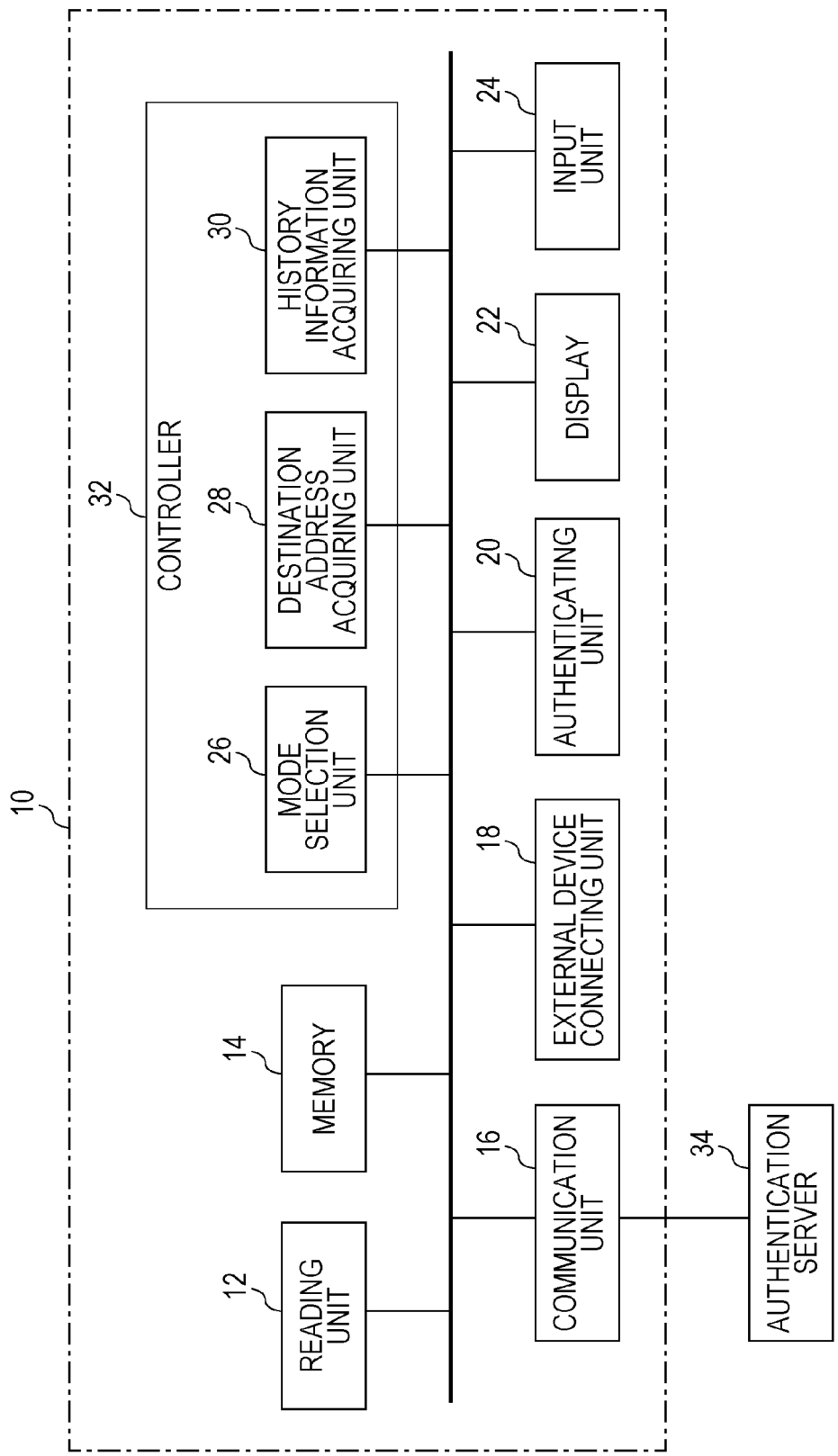
FIG. 1 is a schematic diagram illustrating a configuration of a data transmission apparatus 10 according to a first exemplary embodiment.

FIG. 1 is a schematic diagram illustrating a configuration of a data transmission apparatus 10 according to a first exemplary embodiment. The data transmission apparatus 10 includes a reading unit 12, a memory 14, a communication unit 16, an external device connecting unit 18, an authenticating unit 20, a display 22, an input unit 24, a mode selection unit 26, a destination address acquiring unit 28, a history information acquiring unit 30, and a controller 32. The mode selection unit 26, the destination address acquiring unit 28, and the history information acquiring unit 30 are included in the controller 32. The units are connected to one another via a bus. The data transmission apparatus 10 may be a multifunction machine with a built-in computer that has a print function, a copy function, a scanner function, a FAX function, a communication function, and the like or may be a machine that has only a fax function.

The reading unit 12 is a scanner that acquires image data by optically reading a document. The reading unit 12 may include a tray on which a document is to be placed, a transport mechanism that transports a document from the tray to a reading part, and the like. The reading unit 12 may read a document that is directly placed on a document table, which is made of plastic or glass, by a user.

The memory 14 is, for example, a ROM or a RAM and stores various information such as a program for causing the data transmission apparatus 10 to function and setting information of each of the units. In addition, history information that includes a destination address to which data has been transmitted and a destination address of data in a fixed-destination mode are stored in the memory 14.

The communication unit 16 is, for example, a network card and is a unit that communicates with other devices via a LAN or the Internet. Image data that is acquired by the reading unit 12 is transmitted via the communication unit processed data providing section 16 to a destination address such as an e-mail address that is specified by a user.

The external device connecting unit 18 is, for example, a Universal Serial Bus (USB) connector or a Secure Digital (SD) card slot and is a unit to which a storage medium such as a USB memory or an SD card is to be connected. In the case where a USB memory, an SD card, or the like is designated as a destination of data by a user, image data is forwarded to such a USB memory, SD card, or the like via the external device connecting unit 18.

The authenticating unit 20 performs authentication of a user who uses the data transmission apparatus 10. The authenticating unit 20 includes, for example, a non-contact integrated circuit (IC) card reading device and performs authentication by comparing an ID included in an IC card that is owned by a user and read by the IC card reading device with user information that is acquired from an authentication server 34, which will be described later, via the communication unit 16. As other authentication methods, biometric authentication that is performed by identifying a fingerprint, an iris, a voiceprint, or the like of a user, an authentication method that uses a user ID and a password that are input by a user, and the like may be employed.

The display 22 is, for example, a monitor that is provided on a front panel of the data transmission apparatus 10 and displays various settings of the data transmission apparatus 10, information that helps a user, and the like. A display of the display 22 includes a destination field in which a destination address of image data that is acquired by the reading unit 12 is to be displayed.

The input unit 24 is, for example, a button or a switch that is provided on the front panel of the data transmission apparatus 10 and receives an instruction from a user to the data transmission apparatus 10. In the first exemplary embodiment, the display 22 includes a touch panel, and buttons are displayed in the display 22 as parts of the input unit 24. Therefore, in the first exemplary embodiment, part of the input unit 24 is included in the display 22.

The mode selection unit 26 selects, as an operation mode of the data transmission apparatus 10, one of the following operation modes: an authentication mode in which user authentication is required in order to transmit data, a non-authentication mode in which data may be transmitted without requiring user authentication, and a fixed-destination mode in which data is transmitted only to a fixed destination address that is set by an administrator with or without user authentication.

Selection of an operation mode is performed on the basis of an instruction from an administrator of the data transmission apparatus 10. It is difficult for a general user to perform the selection of an operation mode. In the authentication mode, in the case where a user is not authenticated, it is difficult for the user to operate the data transmission apparatus 10. In the fixed-destination mode, a transmission destination of data is set by the administrator, and it is difficult for a general user to change the transmission destination of data.

The destination address acquiring unit 28 acquires a destination address that is a destination address of data and that is associated with a user who is authenticated by the authenticating unit 20. There may be one or more destination addresses that are associated with a user, and examples of such destination addresses are an e-mail address of the user, an arbitrary address that is specified by the user, and the like. Such a destination address is not limited to an e-mail address. For example, a destination address may be a File Transfer Protocol (FTP) address, an Internet Protocol (IP) address, an address that specifies a USB memory, an SD card, or the like, which is connected to the external device connecting unit 18, a fax number, or the like. A destination address that is associated with a user is included in user information that is acquired from the authentication server 34 when the authenticating unit 20 performs user authentication.

The history information acquiring unit 30 acquires history information that is a group of destination addresses to which data has been transmitted by the data transmission apparatus 10 in the past. For example, each time the data transmission apparatus 10 transmits data, the history information acquiring unit 30 associates the destination address of the data with the transmission time of the data and causes the memory 14 to store the destination address and the transmission time.

Destination addresses the number of which is set by an administrator are stored in the memory 14. In the case where destination addresses the number of which is set by an administrator have already been stored in the memory 14, the following processing is performed. In the case where data is transmitted to a destination address other than the destination addresses that are stored in the memory 14, transmission times that are associated with the corresponding destination addresses are referred to, and a new destination address is stored by removing the destination address that has the oldest transmission time. In the case where data is newly transmitted to one of the destination addresses, which has already been stored in the memory 14, the transmission time that is associated with the destination address is updated.

The memory 14 may be configured to store some but not all of destination addresses to which data is transmitted. More specifically, each time the data transmission apparatus 10 transmits data, the history information acquiring unit 30 causes the display 22 to display an inquiry about whether or not to leave the destination address of the data in the memory 14 and allows a user to choose whether or not to leave a history entry.

History information in an authenticated state that is a group of destination addresses that are used when a user is authenticated and history information in a non-authenticated state that is a group of destination addresses that are used when a user is not authenticated may be stored in the memory 14 independently of each other. In addition, in each case where a user is authenticated, history information in an authenticated state may be stored in such a manner as to be distinguished in accordance with a user who is authenticated. More specifically, the history information acquiring unit 30 associates a destination address of data with information (e.g., a user ID) that indicates a user who is authenticated when data is transmitted and causes the memory 14 to store the destination address and the information.

As a result, when the history information acquiring unit 30 acquires history information from the memory 14, the history information acquiring unit 30 may acquire history information of destination addresses that is user-specific by referring to user IDs that are associated with corresponding destination addresses. In the case where a destination address that is included in history information does not have a user ID that is associated therewith, the history information may be identified as history information in a non-authenticated state.

History information may be stored in an external server or the like. In this case, the history information acquiring unit 30 makes a transmission destination and a transmission time stored in an external server or the like via the communication unit 16 and acquires history information of destination addresses via the communication unit 16.

The controller 32 is a central processing unit (CPU) of the data transmission apparatus 10 and controls functions of the above-described mode selection unit 26, destination address acquiring unit 28, and history information acquiring unit 30. In addition, for example, the controller 32 operates the reading unit 12 in response to an input from the input unit 24, changes a display of the display 22, and the like.

The authentication server 34 is connected to the data transmission apparatus 10 via the communication unit 16, and information that is required for user authentication is stored in the authentication server 34. As described above, user information that is required for user authentication and that includes destination addresses that are associated with corresponding users is stored in the authentication server 34.

Operation of the data transmission apparatus 10 according to the first exemplary embodiment will be described below.

Figure 2:
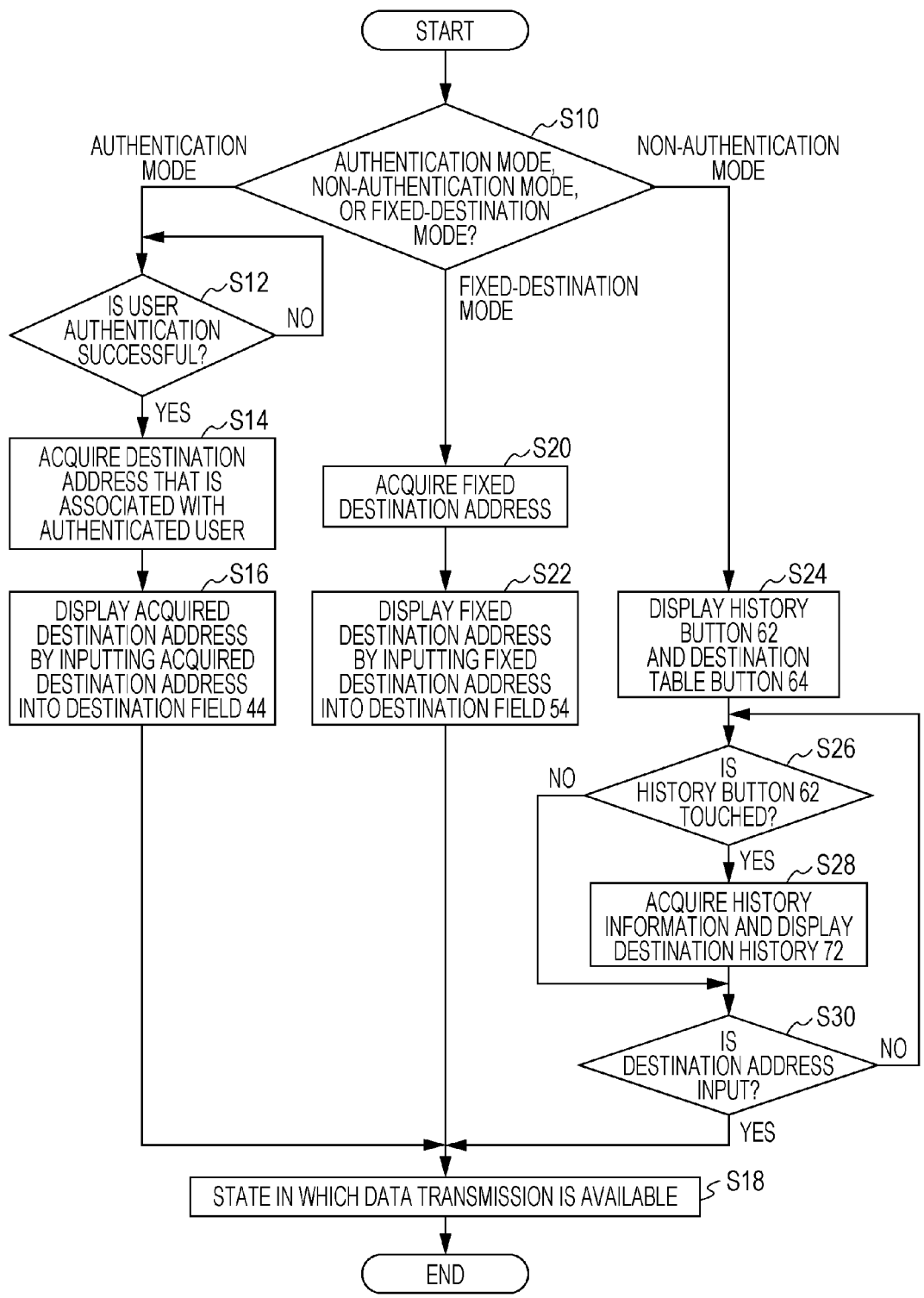
FIG. 2 is a flowchart illustrating a flow of processing that is performed in the data transmission apparatus 10 according to the first exemplary embodiment.

FIG. 2 is a flowchart illustrating a flow of processing that is performed in the data transmission apparatus 10 according to the first exemplary embodiment.

In step S10, the controller 32 determines which one of the authentication mode, the non-authentication mode, and the fixed-destination mode is the operation mode of the data transmission apparatus 10. In the case where it is determined that the authentication mode is the operation mode of the data transmission apparatus 10, the processing moves on to step S12.

In step S12, the controller 32 determines whether or not the authenticating unit 20 has performed user authentication successfully. In the case where user authentication is successful, the processing moves on to step S14. In the case where user authentication is not successful, the processing returns to step S12, and the controller 32 determines whether user authentication is successful or not (i.e., the processing is brought into a standby state for user authentication).

In step S14, the destination address acquiring unit 28 acquires a destination address that is associated with an authenticated user. In the first exemplary embodiment, one destination address is associated with an authenticated user, and the destination address is an e-mail address of the user. Therefore, the destination address acquiring unit 28 acquires an e-mail address of an authenticated user from user information that is acquired from the authentication server 34.

In step S16, the controller 32 displays a destination address that is acquired by the destination address acquiring unit 28 by inputting the destination address into a destination field 44 that is displayed on the display 22. In the first exemplary embodiment, in the authentication mode, it is difficult for a user to change the destination address that has been input in the destination field 44. In other words, an authenticated user may transmit data only to the destination address that is indicated by destination information that is associated with the authenticated user.

In the case where there is no destination address that is associated with an authenticated user, it is difficult to determine a destination address of data, and thus, the controller 32 causes the display 22 to display information that indicates that it is difficult to transmit data.

Figure 3:
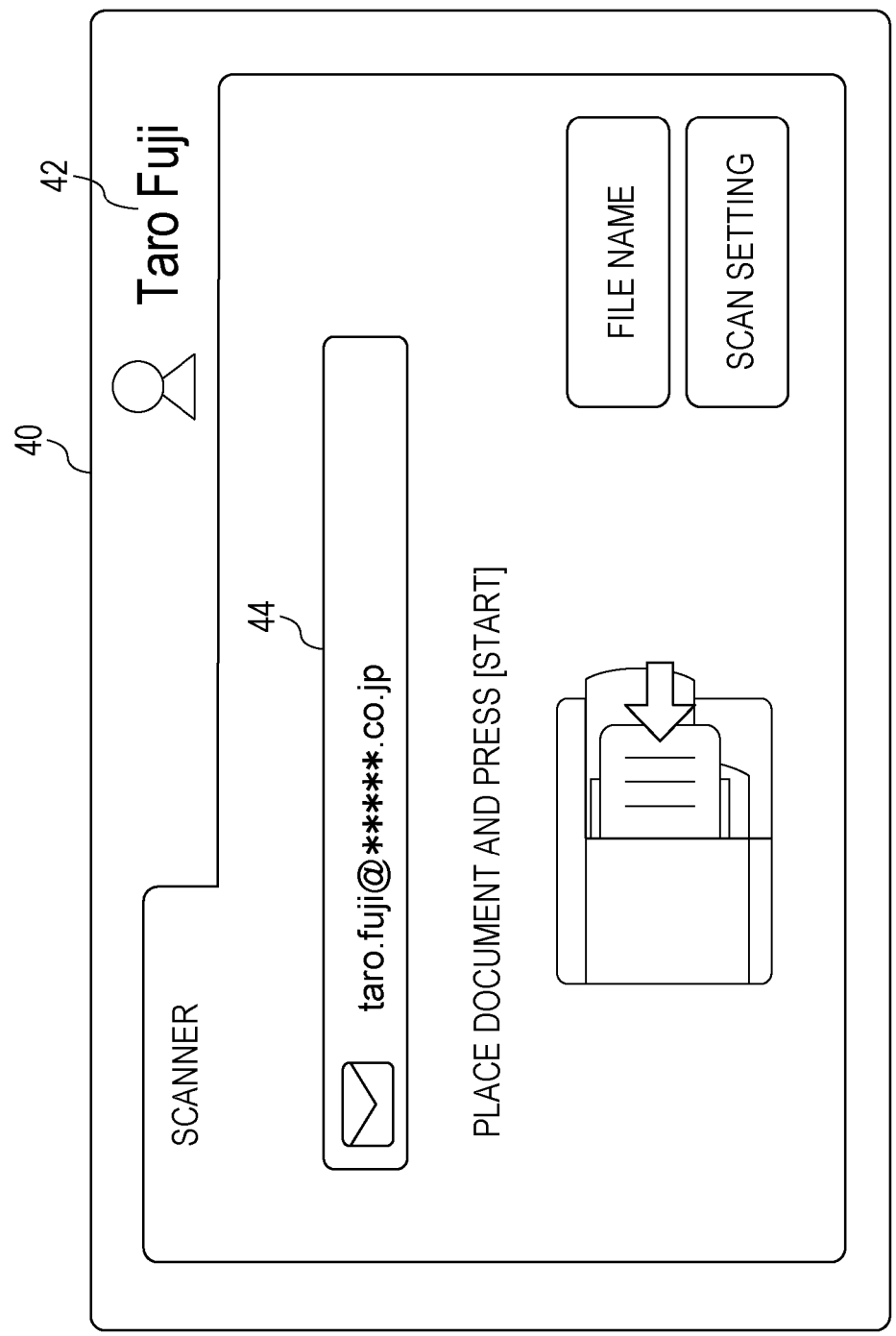
FIG. 3 is a diagram illustrating a screen 40 that is displayed on a display 22 when a user is authenticated.

FIG. 3 is a diagram illustrating a screen 40 that is displayed on the display 22 when a user is authenticated. An authenticated user name 42 and the destination field 44 are included in the screen 40. For example, a user name such as "Taro Fuji" is displayed as the authenticated user name 42 on the basis of user information that is acquired from the authentication server 34. The destination field 44 is displayed in a state where an e-mail address (e.g., "taro.fuji@*****.co.jp") that is associated with an authenticated user and acquired by the destination address acquiring unit 28 is input in the destination field 44 in advance.

Since a destination address is input in the destination field 44, the controller 32 may recognize a destination address of data, and thus, in step S18, the data transmission apparatus 10 is in a state of being ready to transmit data. This state is, for example, a state of waiting for a scan job, and when a scan start button is pressed in step S18, image data that is created as a result of a document being read by the reading unit 12 is transmitted via the communication unit processed data providing section 16 to the e-mail address that is input in the destination field 44.

In step S10, in the case where it is determined that the fixed-destination mode is the operation mode of the data transmission apparatus 10, the processing moves on to step S20.

In step S20, the destination address acquiring unit 28 retrieves a fixed destination address that is set by an administrator from the memory 14.

In step S22, the controller 32 displays a fixed destination address that is set by an administrator by inputting the fixed destination address into a destination field 54 that is displayed on the display 22.

Figure 4:
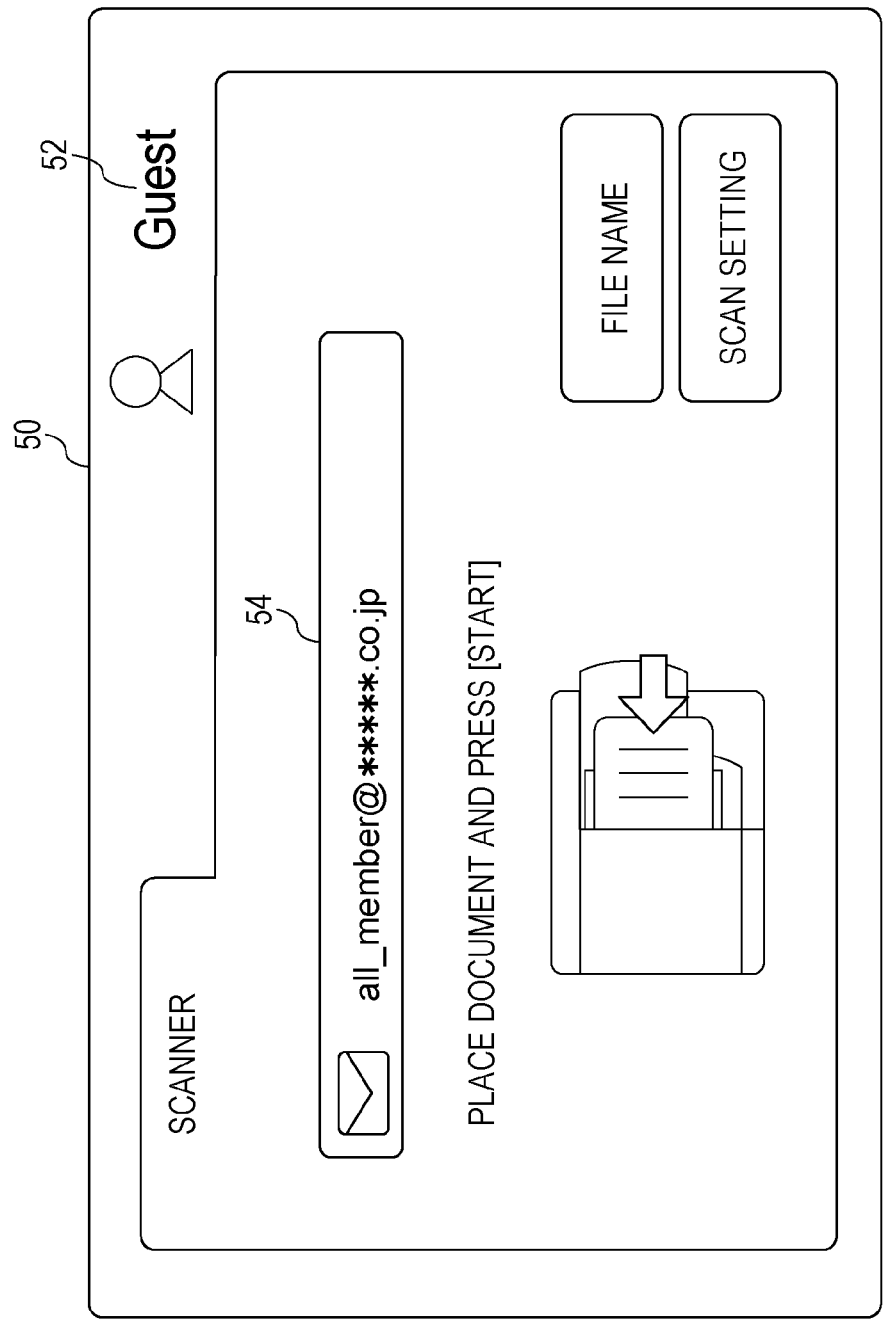
FIG. 4 is a diagram illustrating a screen 50 that is displayed on the display 22 in a fixed-destination mode.

FIG. 4 is a diagram illustrating a screen 50 that is displayed on the display 22 in the fixed-destination mode. A non-authentication display 52 and the destination field 54 are displayed on the screen 50. For example, "Guest" or the like is displayed as the non-authentication display 52, and information that indicates that a user is not authenticated is displayed.

In step S20 and step S22, the controller 32 retrieves a fixed destination address that is set by an administrator, which is, for example, "all_member@*****.co.jp" from the memory 14 and displays the screen 50 on the display 22 in a state where the fixed destination address is input in the destination field 54 in advance. After the screen 50 has been displayed, the processing moves on to step S18 and is brought into a state of waiting for a job such as scan.

In the case where it is determined that the non-authentication mode is the operation mode of the data transmission apparatus 10 in step S10, the processing moves on to step S24. In step S24, the controller 32 displays a screen that includes a history button and a destination table button on the display 22.

Figure 5:
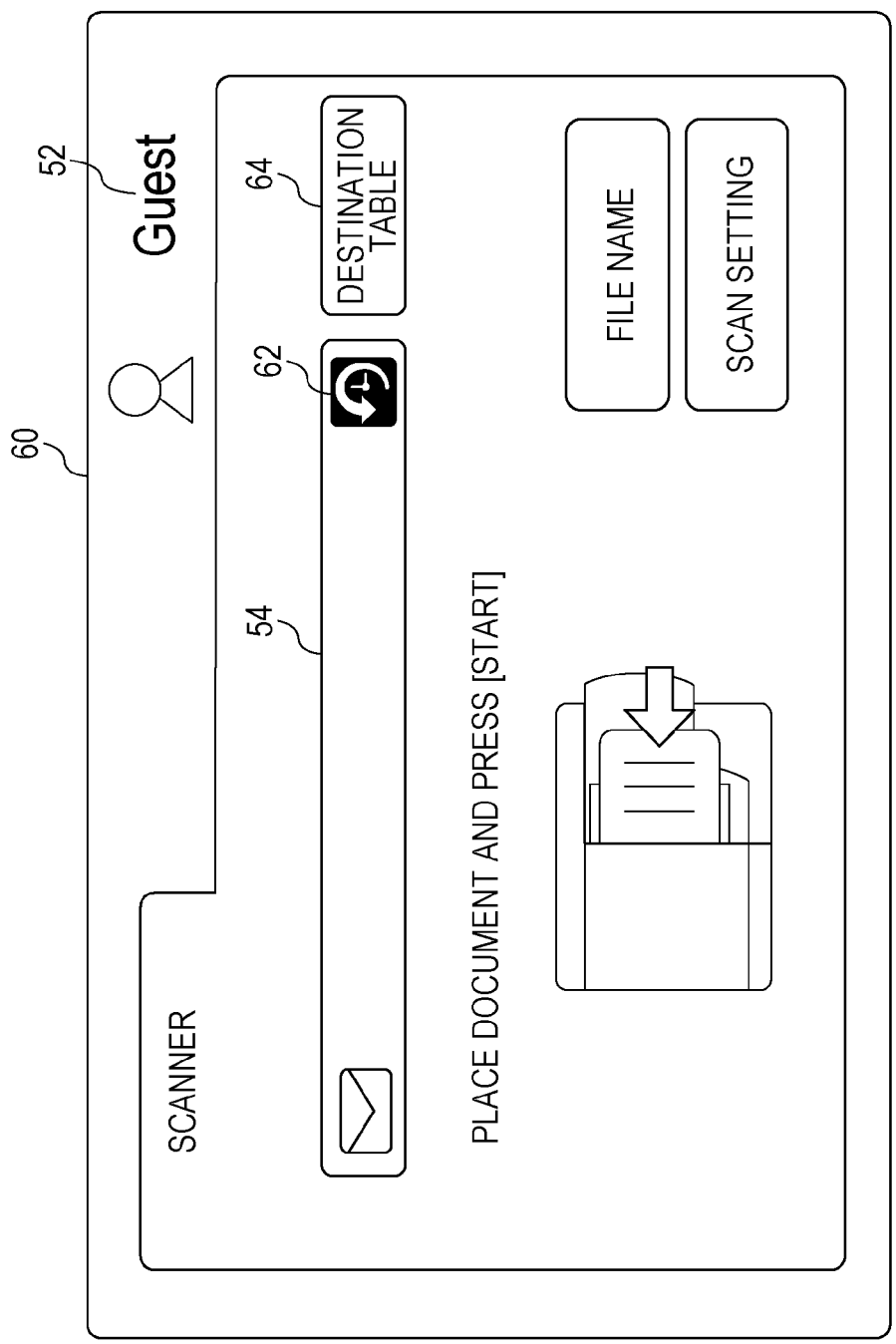
FIG. 5 is a diagram illustrating a screen 60 that is displayed on the display 22 in a non-authentication mode.

FIG. 5 is a diagram illustrating a screen 60 that is displayed on the display 22 in the non-authentication mode. The non-authentication display 52, the destination field 54, a history button 62, and a destination table button 64 are included in the screen 60. In step S24, when the screen 60 is displayed, the destination field 54 is a blank field.

The history button 62 is a button that is to be pressed in order to display a destination address that is included in history information. The destination table button 64 is a button that is to be pressed in order to display a destination table that has been registered in advance by a user. A destination table that has been registered in advance by a user and that has been stored in the memory 14 is data that includes destination names and destination addresses that are associated with each other, and when the destination table button 64 is pressed by a user, the destination names and the destination addresses, which are included in the destination table, are displayed as a list.

In step S26, the controller 32 determines whether the history button 62 has been pressed or not. Since the history button 62 is displayed on the display 22, which includes the touch panel, in practice, the controller 32 determines whether the history button 62 has been touched or not. In the case where it is determined that the history button 62 has been touched, the processing moves on to step S28. In the case where it is determined that the history button 62 has not been touched, the processing moves on to step S30.

In step S28, the history information acquiring unit 30 acquires history information that is a group of destination addresses that have been used in the past as transmission destinations of data. In the first exemplary embodiment, history information is stored in the memory 14, and the history information acquiring unit 30 acquires history information from the memory 14. In addition, the controller 32 causes the display 22 to display destination addresses that are included in the history information, which has been acquired, as a list.

Figure 6:
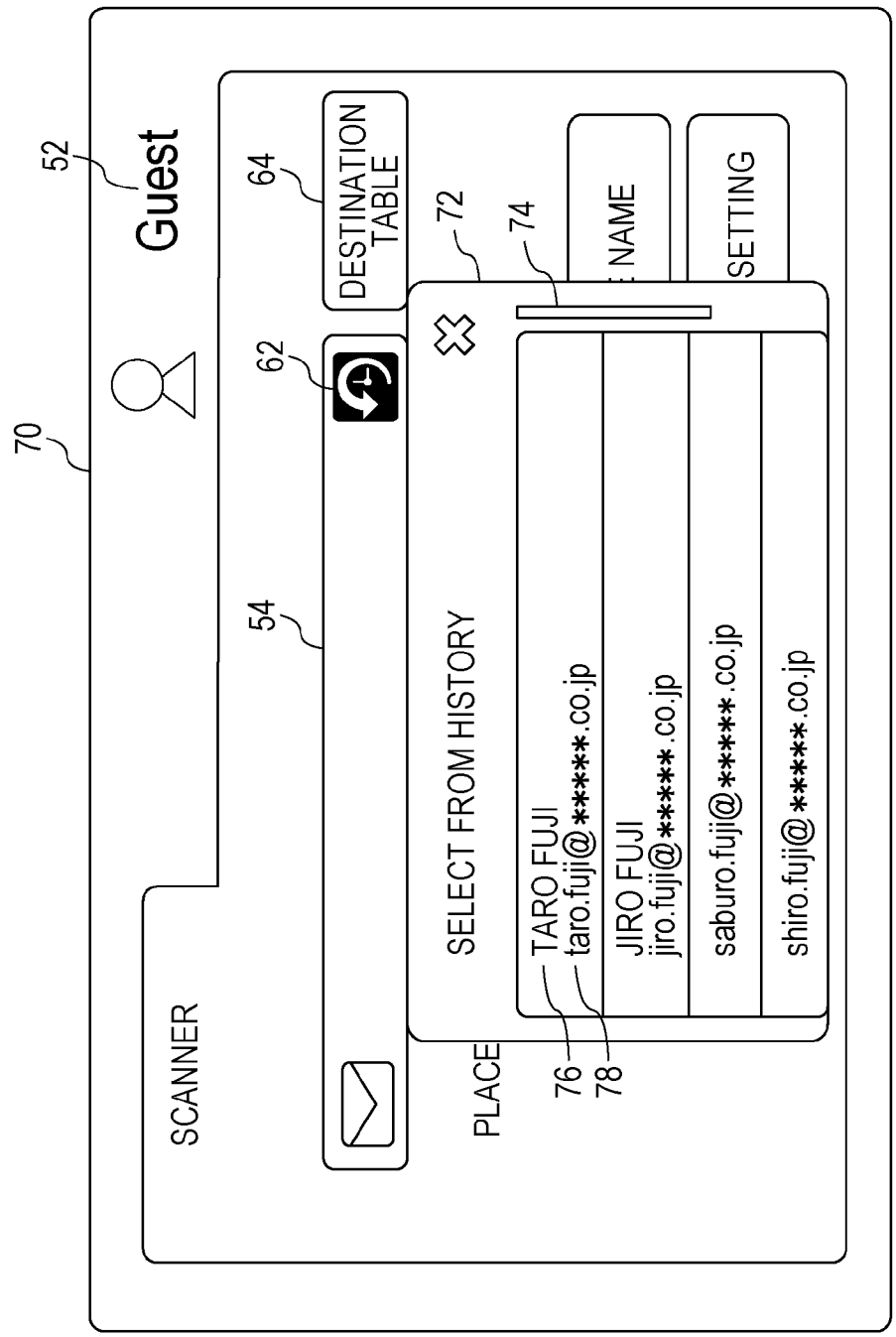
FIG. 6 is a diagram illustrating a state in which a destination history 72 is displayed.

FIG. 6 is a diagram illustrating a state in which a destination history 72 is displayed. When the history button 62 is touched, the destination history 72 is displayed on the display 22. The destination history 72 is a list of destination addresses that are included in history information that has been acquired by the history information acquiring unit 30. In the first exemplary embodiment, a maximum number of destination addresses that may be displayed in the destination history 72 is 10, and in the case where it is difficult to display all of destination addresses at the same time, a scroll bar 74 is displayed. A user operates the scroll bar 74, so that the destination addresses that are displayed are changed.

A destination name 76 and a destination address 78 are included in the destination history 72. In the case where the destination address 78 is registered in a destination table, the destination address 78 and the destination name 76 are displayed side by side. More specifically, the controller 32 refers to the destination table, acquires the destination name 76 that is associated with the destination address 78, and displays the destination name 76 along with the destination address 78. In an example of a screen 70, the destination address "taro.fuji@***.co.jp" is registered in a destination table in such a manner as to be associated with the destination name "Taro Fuji". Therefore, in the destination history 72, the destination name "Taro Fuji" and the destination address "taro.fuji@*.co.jp" are displayed side by side. Since no destination name is associated with the destination address "saburo.fuji@*.co.jp", the destination address "saburo.fuji@***.co.jp" is not displayed along with a destination name. When the destination name 76 or the destination address 78, which are displayed in the destination history 72, is touched, the destination address 78 is input into the destination field 54.

In the case where history information in an authenticated state and history information in a non-authenticated state are stored in the memory 14 independently of each other, only a destination address that is included in the history information in a non-authenticated state may be displayed in the destination history 72. More specifically, the history information acquiring unit 30 determines whether or not a user ID is associated with a destination address that is included in history information, selects only the destination address with which a user ID is not associated from the history information, and displays the destination address in the destination history 72.

In step S30, the controller 32 determines whether a destination address of data has been input in the destination field 54 or not. In the case where it is determined that a destination address has been input in the destination field 54, the processing moves on to step S18. In the case where it is determined that a destination address has not been input in the destination field 54, the processing returns to step S26, and the controller 32 determines again whether or not the history button 62 has been touched or whether or not a destination address has been input in step S30. In other words, the processing is brought into a standby state for input of a destination address into the destination field 54.

As a method of inputting a destination address into the destination field 54, as described above, a destination address may be input into the destination field 54 by allowing a user to touch the destination name 76 or the destination address 78 in the destination history 72, and alternatively, a method of inputting a destination address into the destination field 54 without using the destination history 72 may be employed. For example, a destination address may be input into the destination field 54 by displaying a destination table in response to the user touching the destination table button 64 in such a manner as to allow a user to touch any destination address in the destination table. Alternatively, a software keyboard may be displayed on the display 22 in response to the destination field 54 being directly touched, and a user may directly input a destination address.

As described above, in the first exemplary embodiment, in the authentication mode and in the fixed-destination mode, the controller 32 automatically specifies a destination address of data, and in addition, in the non-authentication mode, the controller 32 causes the history button 62 or the destination table button 64 to be displayed in such a manner as to allow a user to easily specify a destination address of data.

In addition, history information in an authenticated state and history information in a non-authenticated state are acquired independently of each other, so that only the history information in a non-authenticated state is displayed when a user is not authenticated. In other words, the history information in an authenticated state is not displayed when a user is not authenticated.

Second Exemplary Embodiment

Operation of a data transmission apparatus 10 according to a second exemplary embodiment will be described below. Since the configuration of the data transmission apparatus 10 according to the second exemplary embodiment is similar to that of the data transmission apparatus 10 according to the first exemplary embodiment, description thereof will be omitted.

In the second exemplary embodiment, in the fixed-destination mode and in the non-authentication mode, the operation of the data transmission apparatus 10 is similar to that of the data transmission apparatus 10 in the first exemplary embodiment. However, in the authentication mode, the operation of the data transmission apparatus 10 is different from that of the data transmission apparatus 10 in the first exemplary embodiment. In the first exemplary embodiment, in the authentication mode, it is difficult for a user to change a destination address of data. However, in the second exemplary embodiment, a user is allowed to change a destination address of data.

Figure 7:
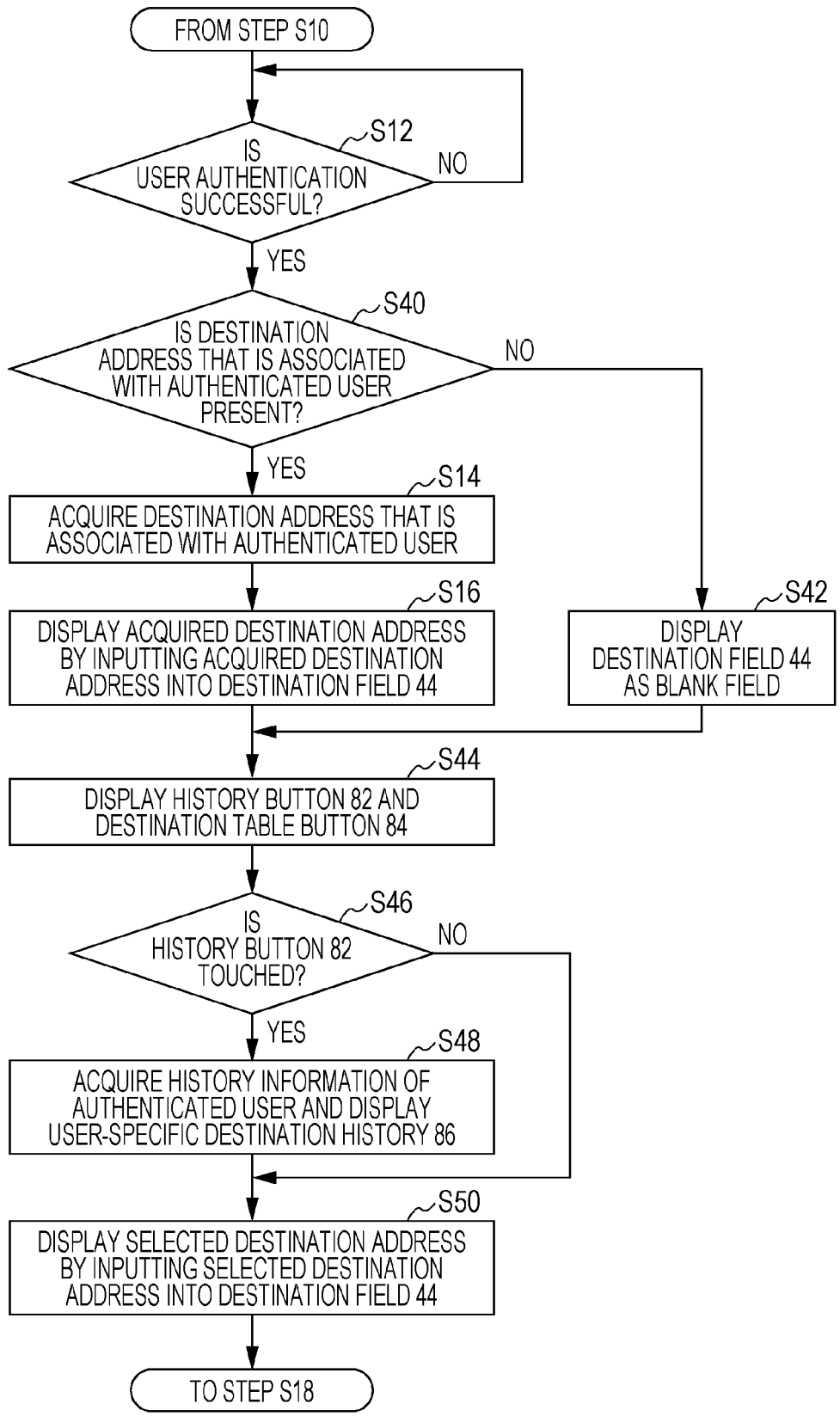
FIG. 7 is a flowchart illustrating a flow of processing that is performed in a data transmission apparatus 10 according to a second exemplary embodiment.

FIG. 7 is a flowchart illustrating a flow of processing that is performed in the data transmission apparatus 10 according to the second exemplary embodiment. The processing in steps S12, S14, and S16 is the same as that of the first exemplary embodiment, and description thereof will be omitted.

In step S40, the destination address acquiring unit 28 determines whether a destination address that is associated with an authenticated user is present or not. In the case where a destination address that is associated with an authenticated user is present, the processing moves on to step S14. In the case where a destination address that is associated with an authenticated user is not present, the processing moves on to step S42.

In step S42, the controller 32 causes the destination field 44 to be displayed as a blank field on the display 22.

Note that, in the second exemplary embodiment, even in the case where user authentication is successful in the authentication mode, and where a destination address that is associated with an authenticated user is present, the destination field 44 may be left as a blank field by not displaying the destination address in the destination field 44 in accordance with an instruction from an administrator.

In step S44, the controller 32 causes a history button and a destination table button to be displayed on the display 22.

Figure 8:
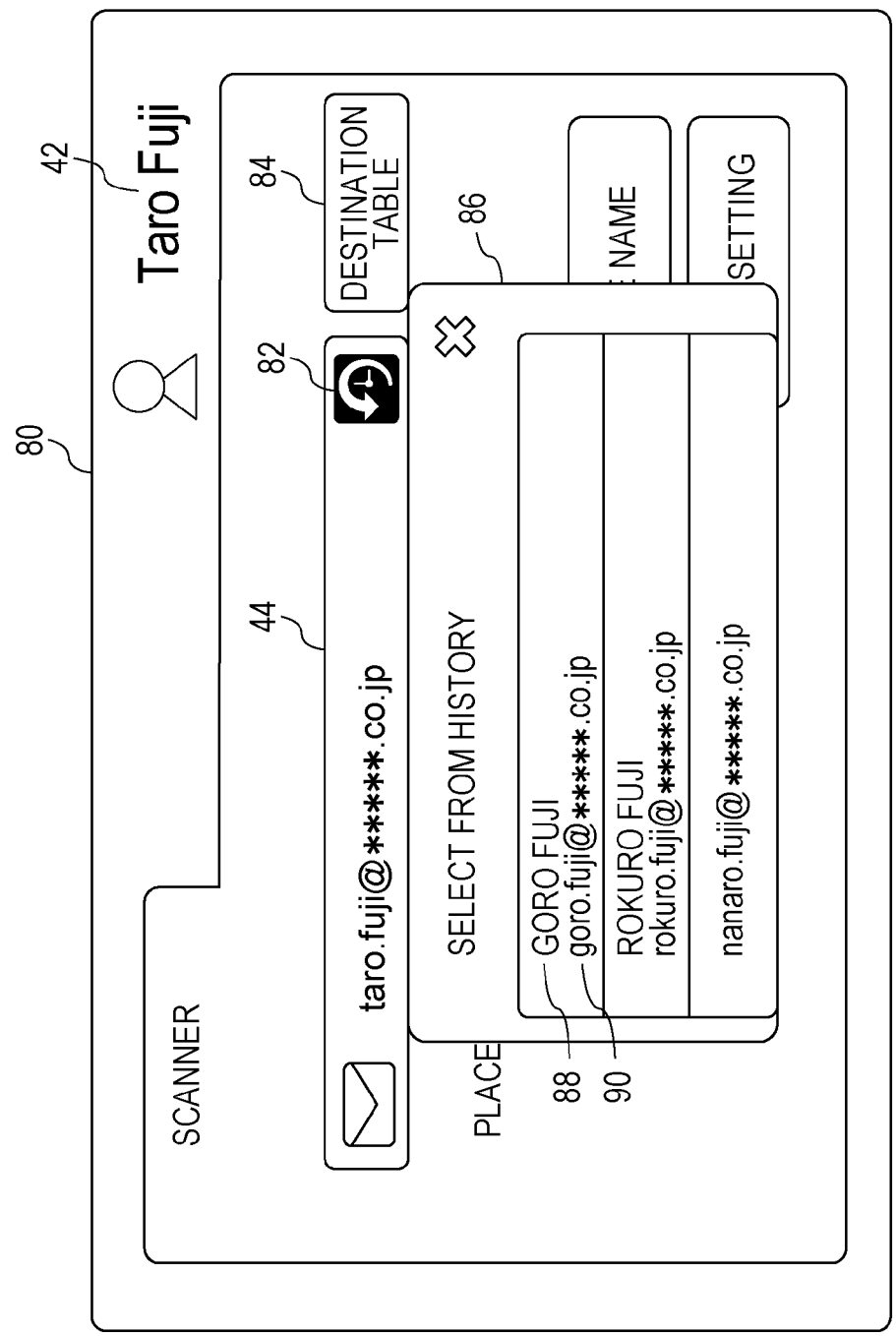
FIG. 8 is a diagram illustrating a state in which a user-specific destination history 86 is displayed when a user is authenticated.

FIG. 8 is a diagram illustrating a state in which a user-specific destination history 86 is displayed when a user is authenticated. The authenticated user name 42, the destination field 44, a history button 82, and a destination table button 84 are included in a screen 80.

Similarly to as in the first embodiment, the history button 82 is a button that is to be touched in order to display a history of destination addresses to which data has been transmitted by the data transmission apparatus 10. Similarly to as in the first embodiment, the destination table button 84 is a button that is to be touched in order to display a destination address that has been registered in advance by a user. A destination name and a destination address that are displayed by touching the destination table button 84 may be different depending on an authenticated user. In other words, the controller 32 associates a user ID of a user who is authenticated when a destination table is registered with the destination table and causes the memory 14 to store the user ID and the destination table. Then, the controller 32 refers to a user ID of a user who is authenticated when the destination table button 84 is touched, acquires a destination table of the authenticated user, and causes a destination name and a destination address that are included in the destination table to be displayed.

In step S46, the controller 32 determines whether the history button 82 has been touched or not. In the case where it is determined that the history button 82 has been touched, the processing moves on to step S48. In the case where it is determined that the history button 82 has not been touched, the processing moves on to step S50.

In step S48, the history information acquiring unit 30 acquires history information that is a group of destination addresses that have been used as transmission destinations of data in the past. In the second exemplary embodiment, a user ID of a user who is authenticated when data is transmitted is associated with a destination address that is included in history information. The history information acquiring unit 30 refers to a user ID of a user who is currently authenticated and user IDs that are included in history information and acquires only history information of the user who is currently authenticated.

FIG. 8 is a diagram illustrating a state in which the user-specific destination history 86 is displayed. When the history button 82 is touched, the user-specific destination history 86 is displayed on the display 22. The user-specific destination history 86 is a list of destination addresses that are included in history information of an authenticated user. In the second exemplary embodiment, a maximum number of destination addresses that may be displayed in the user-specific destination history 86 is three.

A destination name 88 and a destination address 90 are included in the user-specific destination history 86. In the case where the destination address 90 is registered in a destination table of an authenticated user, the destination address 90 and the destination name 88 are displayed side by side. In an example of the screen 80, the destination address "goro.fuji@***.co.jp" is registered in a destination table of an authenticated user in such a manner as to be associated with the destination name "Goro Fuji". Therefore, in the user-specific destination history 86, the destination name "Goro Fuji" and the destination address "goro.fuji@*.co.jp" are displayed side by side. Since no destination name is associated with the destination address "nanaro.fuji@*.co.jp" in the destination table of the authenticated user, the destination address "nanaro.fuji@***.co.jp" is not displayed along with a destination name. When the destination name 88 or the destination address 90, which are displayed in the user-specific destination history 86, is touched, the destination address 90 is input into the destination field 44.

In step S50, the controller 32 causes a destination address that is selected by a user to be displayed by inputting the destination address into the destination field 44.

As in the non-authentication mode in the first exemplary embodiment, as a method of inputting a destination address into the destination field 44, a destination address may be input into the destination field 44 by displaying a destination table of a user who is authenticated in response to the user touching the destination table button 84 in such a manner as to allow the user to touch any destination address in the destination table. Alternatively, a software keyboard may be displayed on the display 22 in response to the destination field 44 being directly touched, and a user may directly input a destination address.

In the flowchart of FIG. 7, regardless of the existence of a destination address that is associated with an authenticated user, the history button 82 and the destination table button 84 are displayed on the display 22. However, the history button 82 and the destination table button 84 may be displayed on the display 22 only in the case where a destination address that is associated with an authenticated user is not present.

Figure 9:
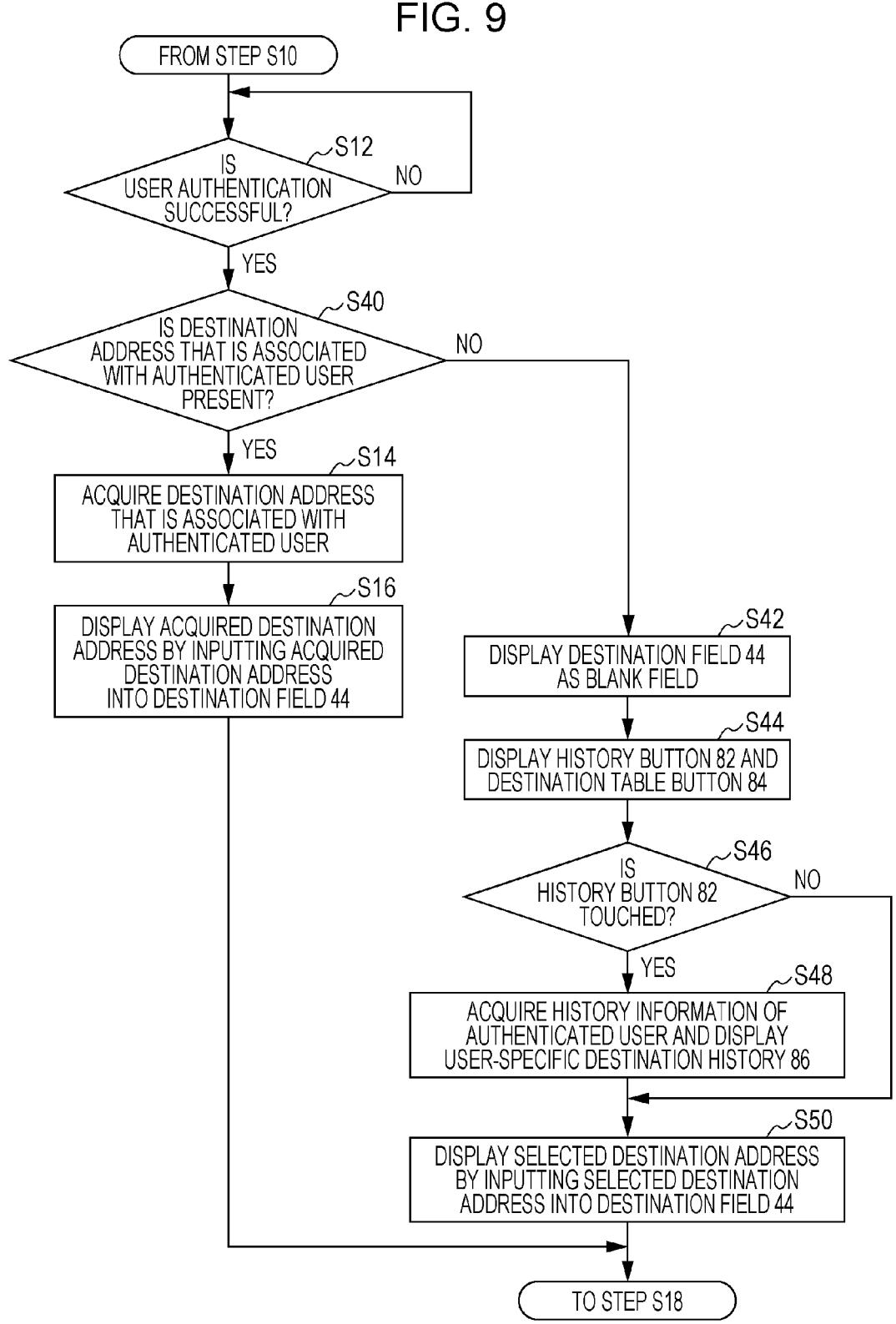
FIG. 9 is a flowchart illustrating a flow of another processing that is performed in the data transmission apparatus 10 according to the second exemplary embodiment.

FIG. 9 is a flowchart illustrating a flow of another processing that is performed in the data transmission apparatus 10 according to the second exemplary embodiment. The flowchart of FIG. 9 illustrates a flow of processing of displaying the history button 82 and the destination table button 84 on the display 22 only in the case where a destination address that is associated with an authenticated user is not present.

As illustrated in FIG. 9, in the case where a destination address that is associated with an authenticated user is present in step S40, the processing in steps S14 to S16 is performed, and the processing moves on to step S18 without displaying the history button 82 and the destination table button 84. In the case where a destination address that is associated with an authenticated user is not present, the processing in steps S42 to S50 is performed, and the history button 82 and the destination table button 84 are displayed in such a manner as to allow a user to select a destination address.

As described above, in the second exemplary embodiment, in the authentication mode, data may be transmitted to a destination address that is associated with an authenticated user as well as to other destination addresses. In the authentication mode, displaying the history button 82 and the destination table button 84 enables an authenticated user to easily specify a destination address of data when the user changes a destination address.

In addition, history information is acquired in such a manner as to be distinguished in accordance with a user, so that, when a user is authenticated, only history information of the authenticated user that includes destination addresses of data is displayed. In other words, history information of other users is not displayed in the authentication mode.

Third Exemplary Embodiment

Operation of a data transmission apparatus 10 according to a third exemplary embodiment will be described below. Since the configuration of the data transmission apparatus 10 according to the third exemplary embodiment is similar to that of the data transmission apparatus 10 according to the first exemplary embodiment, description thereof will be omitted.

In the third exemplary embodiment, in the fixed-destination mode and in the non-authentication mode, the operation of the data transmission apparatus 10 is similar to that of the data transmission apparatus 10 in the first exemplary embodiment. However, in the authentication mode, the operation of the data transmission apparatus 10 is different from that of the data transmission apparatus 10 in the first exemplary embodiment. In the third exemplary embodiment, when a storage medium such as a USB memory or an SD card is connected to the external device connecting unit 18, a destination address that indicates the storage medium is automatically input into the destination field 44.

Figure 10:
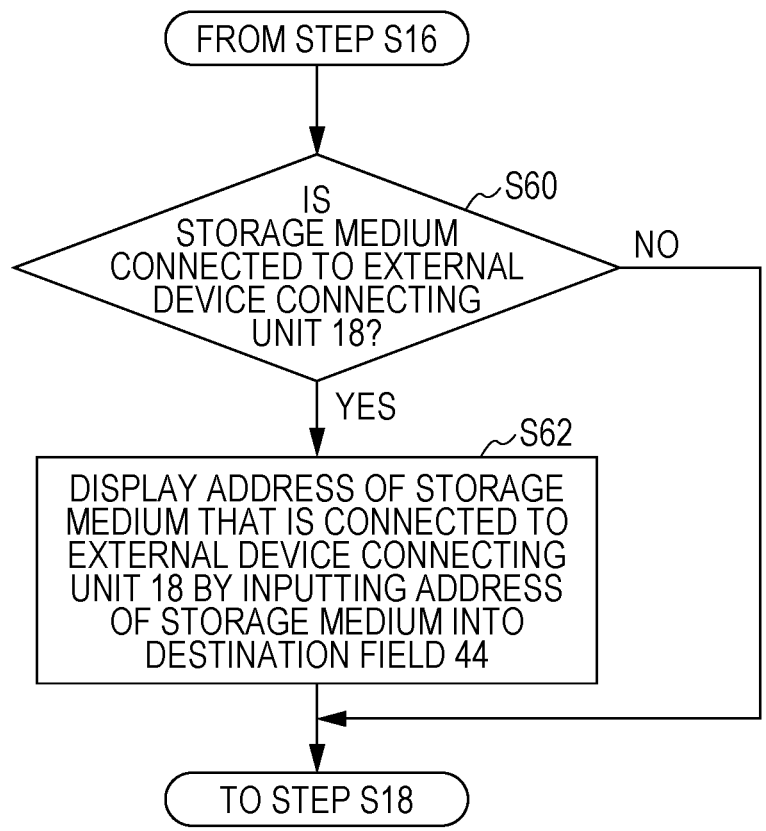
FIG. 10 is a flowchart illustrating a flow of processing that is performed in a data transmission apparatus 10 according to a third exemplary embodiment.

FIG. 10 is a flowchart illustrating a flow of processing that is performed in the data transmission apparatus 10 according to the third exemplary embodiment.

In step S60, the controller 32 determines whether a storage medium is connected to the external device connecting unit 18 or not. For example, in the case where a USB memory is received in the external device connecting unit 18, the controller 32 receives a recognition-control signal that is transmitted from the USB memory and detects that the USB memory is received.

In step S62, the controller 32 displays an address that indicates a storage medium that is connected to the external device connecting unit 18 by inputting the address into the destination field 44. For example, an appropriate drive letter is allocated to a USB memory that is received in the external device connecting unit 18, and a destination is specified as "F:¥" (F is a drive letter).

In the case where a user connects a storage medium with the external device connecting unit 18, it is very likely that the user intends to store data into the storage medium. Considering this, in the third exemplary embodiment, in the case where a storage medium is connected to the external device connecting unit 18, a destination address that indicates the storage device is automatically input into the destination field 44.

Note that, also in the case where a user is not authenticated, when a storage medium is connected to the external device connecting unit 18, a destination address that indicates the storage medium may be input into the destination field 44. However, considering security, only in the case where a user is authenticated, when a storage medium is connected to the external device connecting unit 18, a destination address that indicates the storage medium may be input into the destination field 44.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data transmission apparatus having an authentication mode in which user authentication is required in order to transmit data and a non-authentication mode in which data is transmitted without requiring user authentication, the data transmission apparatus comprising:
    at least one hardware processor configured to implement:
        an authenticating unit that authenticates a user;
        an address acquiring unit that acquires a destination that is a transmission destination of data and that is associated with the user who is authenticated; and
        a history information acquiring unit that acquires first history information that is a group of destinations that have been used previously; and
    a display configured to display the destination, which is associated with the user who is authenticated, as a destination of data in the case where the authenticating unit performs user authentication successfully in the authentication mode and to display a destination that is included in the first history information as a candidate for a destination of data in the non-authentication mode,
    wherein the display is further configured to display on a same screen, in the case where the authenticating unit performs user authentication successfully in the authentication mode, a destination that is included in second history information associated with the user as a candidate for a destination of data along with the destination, which is associated with the user who is authenticated, and
    wherein the display is further configured to display, in the case where the authenticating unit performs user authentication successfully in the authentication mode, and where the destination, which is associated with the user who is authenticated, is not present, a destination that is included in the second history information as a candidate for a destination of data.

2. The data transmission apparatus according to claim 1, wherein the history information acquiring unit acquires the second history information in an authenticated state that is a group of destinations that are used in the authentication mode and the first history information in a non-authenticated state that is a group of destinations that are used in the non-authentication mode independently of each other, and
    wherein the display is further configured to display a destination that is included in the first history information in a non-authenticated state as a candidate for a destination of data in the non-authentication mode.

3. The data transmission apparatus according to claim 1, wherein the first history information includes the group of destinations that have been used previously, stored according to times that the group of destinations are last used.

4. The data transmission apparatus according to claim 1, wherein the display is configured to display a plurality of destinations included in the first history information as selectable candidates for the destination of data in the non-authentication mode.

5. The data transmission apparatus according to claim 4, wherein the display is configured to display the plurality of destinations in an order according to times that the plurality of destinations are last used, as selectable candidates for the destination of data in the non-authentication mode.

6. The data transmission apparatus according to claim 1, wherein the display is configured to display, in the case where the authenticating unit performs user authentication successfully in the authentication mode, a plurality of destinations included in the second history information associated with the user as candidates for a destination of data along with the destination, which is associated with the user who is authenticated.

7. A data transmission method comprising:
    authenticating a user;

acquiring a destination that is a transmission destination of data and that is associated with the user who is authenticated;

acquiring first history information that is a group of destinations that have been used previously; and displaying the destination, which is associated with the user who is authenticated, as a destination of data in the case where the authenticating a user is successful in an authentication mode and displaying a destination that is included in the first history information as a candidate for a destination of data in a non-authentication mode, the authentication mode requiring user authentication in order to transmit data, the non-authentication mode enabling data transmission without requiring user authentication, wherein the displaying comprises:

displaying on a same screen, in the case where the authenticating a user is successful in the authentication mode, a destination that is included in second history information associated with the user as a candidate for a destination of data along with the destination, which is associated with the user who is authenticated; and displaying, in the case where the authenticating a user is successful in the authentication mode, and where the destination, which is associated with the user who is authenticated, is not present, a destination that is included in the second history information as a candidate for a destination of data.

8. A non-transitory computer readable medium storing a program causing a computer to execute a process comprising:

authenticating a user;

acquiring a destination that is a transmission destination of data and that is associated with the user who is authenticated;

acquiring first history information that is a group of destinations that have been used previously; and displaying the destination, which is associated with the user who is authenticated, as a destination of data in the case where the authenticating a user is successful in an authentication mode and displaying a destination that is included in the first history information as a candidate for a destination of data in a non-authentication mode, the authentication mode requiring user authentication in order to transmit data, the non-authentication mode enabling data transmission without requiring user authentication, wherein the displaying comprises:

displaying on a same screen, in the case where the authenticating a user is successful in the authentication mode, a destination that is included in second history information associated with the user as a candidate for a destination of data along with the destination, which is associated with the user who is authenticated; and displaying, in the case where the authenticating a user is successful in the authentication mode, and where the destination, which is associated with the user who is authenticated, is not present, a destination that is included in the second history information as a candidate for a destination of data.

* * * * *